Sept. 6, 1927.  
J. M. NEENAN  
1,641,898  
GLASS FURNACE  
Filed May 7, 1924
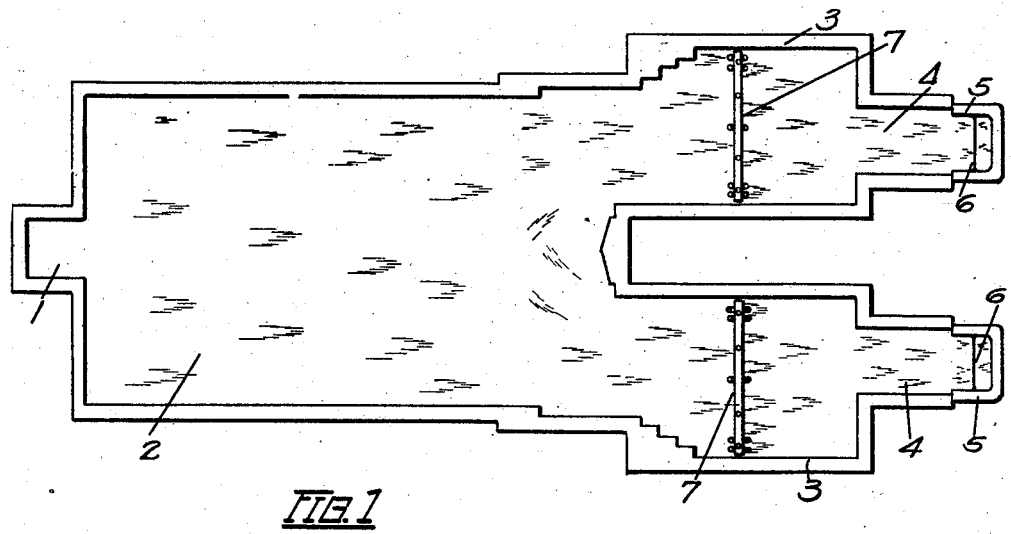
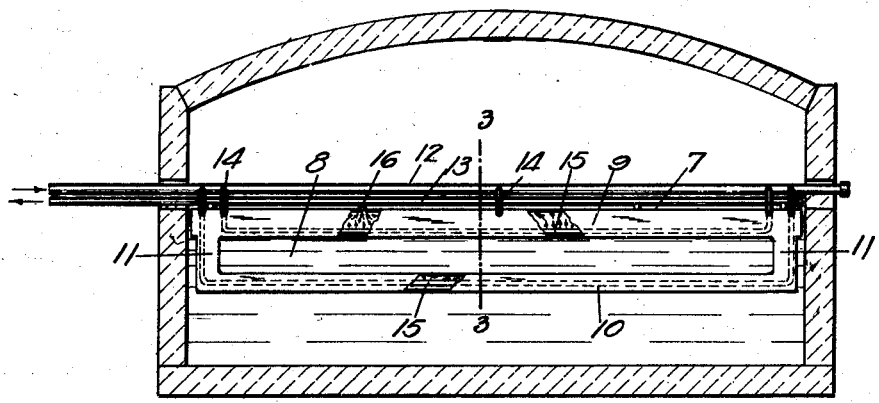
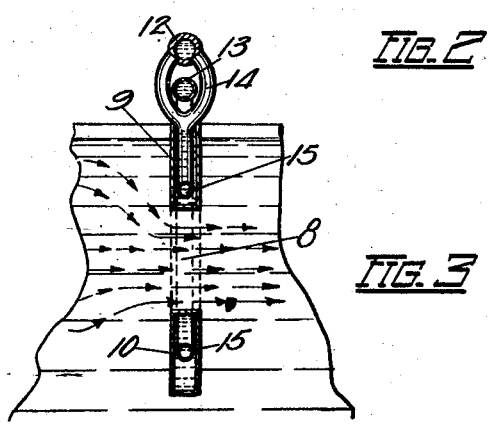
INVENTOR  
Joseph M. Neenan  
BY C. A. Rowley  
ATTORNEY Patented Sept. 6, 1927.

1,641,898

UNITED STATES PATENT OFFICE.

JOSEPH M. NEENAN, OF SHREVEPORT, LOUISIANA, ASSIGNOR TO THE LIBBEY-OWENS SHEET GLASS COMPANY, OF TOLEDO, OHIO, A CORPORATION OF OHIO.

GLASS FURNACE.

Application filed May 7, 1924. Serial No. 711,523.

This invention relates to improvements in glass furnaces, and more particularly to a process and apparatus for controlling the flow of molten glass through a continuous tank furnace to supply glass drawing machines.

In the usual installations for drawing sheet glass, glass-producing materials are melted in one end of a continuous tank furnace, the molten glass flowing slowly through the refining portion of the furnace into a shallower receptacle or receptacles at the delivery end of the furnace, the glass sheets being drawn upwardly from the surface of this molten glass. The greater portion of the glass which is drawn away in sheet form is taken from the surface of the molten pool and the greater portion of the flow through the furnace is a surface flow, the lower strata of the glass in the tank having slight movement and being relatively stagnant. Due to the inactivity of the lower glass strata, the producing capacity of the tank is limited to the volume of the surface flow, and this system has a further defect that all impurites or dirt, which are normally carried on the surface of the molten pool, will pass directly into the glass sheets.

Attempts have been made to enforce a deeper flow, and also skim impurities from the surface glass, by providing refractory floaters partly immersed in the surface glass transversely of the tank. Such floaters are rather rapidly eaten away by the frictional and corrosive action of the molten glass and the clay particles carried away from the floater tend to pollute the glass, and also lines or variegated temperature conditions in the molten stream are caused by cold or devitrified glass that forms on and clings to the worn edges of the floater.

According to the present invention a metallic shield or partition, which is hollow and internally water-cooled, is positioned transversely of the tank and partially immersed in the molten pool. Preferably, the partition extends to a considerable depth into the molten glass, and is provided with a longitudinal slot or passage below the glass surface, but parallel therewith, through which selected intermediate strata of the molten glass may flow. The cooling of the partition is just sufficient to protect the metallic casing from the high temperature conditions in the pool, and does not excessively chill the molten glass passing therethrough. This partition enforces a deeper flow of glass through the tank, holds back or skims the surface glass, and limits the glass flow to selected intermediate strata of the glass, just below the surface, which are best adapted for sheet-forming purposes. The smooth walls of the metallic casing are not readily worn away by the molten glass and there is no tendency for the formation of strings or devitrified glass which would affect the homogeneity of the molten pool formed beyond the partition.

The objects and advantages of the invention will be better understood from the following detailed description of one approved form of the apparatus.

In the accompanying drawings:

Fig. 1 is a plan of one type of glass furnace with the improved flow-controlling members installed therein.

Fig. 2 is a transverse vertical section, on an enlarged scale, showing one of the partitions installed in a portion of the furnace.

Fig. 3 is a vertical section on a still larger scale through the water-cooled partition. This view is taken substantially on the line 3—3 of Fig. 2.

In the form of glass furnace here diagrammatically illustrated, glass-producing materials are inserted into the furnace through doghouse 1, and then melted in the melting tank 2. The molten glass flows slowly toward the right, Fig. 1, through the refining end of the tank, and is then divided into two streams passing through the separate refining chambers 3 and cooling chambers 4 to the draw-pots 5 from which glass sheets 6 are drawn upwardly. Usually a relatively deep body of molten glass is maintained in the melting tank 2 and refining tanks 3, the molten pool being somewhat shallower in the cooling tanks 4 and considerably shallower in draw-pots 5 from which the glass sheets are drawn.

As here shown, the coolers or partitions 7 are positioned transversely of the refining tanks 3, at a point where the molten glass is already in a refined and settled condition, but is still sufficiently hot and fluid to pass freely through the regulator or partition member.

Each partition 7 or cooler is in the form of a rather wide thin hollow metallic shield, of a length substantially equal to the inside width of the refining chamber. A longitudinal slot or passage 8 through the cooler divides the same into an upper cross-bar 9 and a lower cross-bar 10 connected at each end by a vertically extending portion 11. The cooler is adapted to be immersed into the flowing glass to such an extent that the upper edge of the upper bar 9 will be somewhat above the normal glass level of the molten pool. The lower bar 10 will extend down into the middle strata of glass in the tank, and the flow of glass through the partition will be limited to those strata slightly below the surface, as indicated more clearly in Fig. 3 of the drawings.

The partition or cooler is hung from a pair of parallel pipe members 12 and 13 extending through the side walls of the tank to act as a supporting means. The cooling water flows in at one end of pipe 12, as shown in Fig. 2, and thence downwardly through extensions 14, curving around outlet pipe 13, into the interior of the casing where they connect with inner feed pipes 15 which extend through both the upper and lower bars 9 and 10. Feed pipes 15 are provided with a series of spaced holes or openings through which the cooling water is distributed throughout the length of the cooler to the interior thereof. The water flows out from the casing through openings 16 in the top of bar 9 to the outlet pipe 13, and thence out one end of this pipe as shown in Fig. 2.

By reason of the pressure exerted by the glass-producing materials inserted through doghouse 1, and the pull exerted by the glass drawing machines, a continuous flow of glass will be enforced through the tank, causing a continuous flow of selected sub-surface glass through the slot or passage 8 in the partition member. Some of this glass will rise to the surface after passing through the partition, but a deeper and more uniform flow of glass through the refining end of the tank into the draw-pot will result. At the same time the surface glass will be held back or skimmed by the upper bar 9 of the floater, and the impurities may be raked out at intervals through the sides of the tank.

The location of the coolers or partitions, as shown in Fig. 1, is merely one example of many positions in which these might be used. For example, a single longer cooler might be positioned in the refining end of the melting tank.

I claim:

1. In a continuous tank-furnace for supplying molten glass to a glass-working machine, means for restricting the flow of the upper glass strata through the tank, comprising an internally water-cooled metallic partition member extending transversely across the tank and projecting down through the uppermost strata of the molten glass, and having a slot or passage for allowing the glass to flow therethrough, the slot being below the normal glass level.

2. In a continuous tank-furnace for supplying molten glass to a glass-working machine, means for restricting the flow of the upper glass strata through the tank, comprising an internally water-cooled metallic partition member extending transversely across the tank and projecting down through the uppermost strata of the molten glass, and having a slot or passage for allowing the glass to flow therethrough, the slot being below the normal glass level and parallel therewith.

3. Means for controlling the flow of molten glass through a continuous tank-furnace, comprising a water-cooled metallic partition member adapted to be projected downwardly into the molten stream transversely thereof, and pipes extending into and through the partition for distributing the incoming water equally throughout all portions thereof.

4. Means for controlling the flow of molten glass through a continuous tank-furnace, comprising a water-cooled metallic partition member adapted to be projected downwardly into the molten stream transversely thereof, there being a slot or passage through the partition below the glass level, and pipes extending into and through the partition for distributing the incoming water equally throughout all portions thereof.

5. Means for providing a deeper flow of conditioned glass from a producing tank to a sheet drawing means, comprising a metallic heat absorbing body positioned in the path of flow of the surface strata of the molten glass and having a slot therein through which the glass flows.

6. In sheet glass apparatus, a continuous tank furnace for supplying molten glass to a glass working machine, and a slotted member suspended in the tank for restricting the flow of the upper glass strata through the said tank.

7. In sheet glass apparatus, a continuous tank furnace for supplying molten glass to a glass working machine, and a slotted member suspended in the tank and projecting down through the uppermost strata of the molten glass for restricting the flow of the upper glass strata through said tank.

8. In sheet glass apparatus, a continuous tank furnace for supplying molten glass to a glass working machine, and means arranged transversely of the furnace and suspended therein and having a portion dipped below the surface of the molten glass for restricting movement of the upper strata toward the glass working machine, and said means having a slot arranged below the surface of the glass to permit the sub-surface glass to flow toward the working end.

9. In sheet glass apparatus, a continuous tank furnace for supplying molten glass to a glass working machine, and a slotted member arranged in the tank for restricting the flow of the upper glass strata through the said tank, the molten glass also being free to pass under said slotted member.

10. In sheet glass apparatus, a continuous tank furnace for supplying molten glass to a glass working machine, and a slotted member suspended in the tank for restricting the flow of the upper glass strata through the said tank, the molten glass being free to pass through the said slot and also under the slotted member.

11. In sheet glass apparatus, a continuous tank furnace for supplying molten glass to a glass working machine, a slotted member suspended in the tank for restricting the flow of the upper glass strata through the said tank, the molten glass being free to pass through the said slot and also under the slotted member, and means for passing a heat absorbing medium through said slotted member.

Signed at Shreveport, in the parish of Caddo, and State of Louisiana, this 30th day of April, 1924.

JOSEPH M. NEENAN.